US008931619B2

(12) United States Patent
Grootherder

(10) Patent No.: US 8,931,619 B2
(45) Date of Patent: Jan. 13, 2015

(54) EGG TRANSPORT DEVICE FOR A PACKAGING DEVICE FOR EGGS

(75) Inventor: Berend Derk Grootherder, Brummen (NL)

(73) Assignee: Moba Group B.V., Barneveld (NL)

( * ) Notice: Subject to any disclaimer, the term of this patent is extended or adjusted under 35 U.S.C. 154(b) by 0 days.

(21) Appl. No.: 14/113,834

(22) PCT Filed: Mar. 22, 2012

(86) PCT No.: PCT/NL2012/050176
§ 371 (c)(1),
(2), (4) Date: Nov. 13, 2013

(87) PCT Pub. No.: WO2012/148263
PCT Pub. Date: Nov. 1, 2012

(65) Prior Publication Data
US 2014/0054130 A1  Feb. 27, 2014

(30) Foreign Application Priority Data
Apr. 26, 2011 (NL) .................................. 2006663

(51) Int. Cl.
*B65G 47/46* (2006.01)
*B65G 43/08* (2006.01)
*B65G 47/24* (2006.01)
(Continued)

(52) U.S. Cl.
CPC .............. *B65G 47/46* (2013.01); *B65G 43/08* (2013.01); *B65G 47/24* (2013.01); *B65G 47/31* (2013.01); *B65B 23/06* (2013.01)
USPC .......................................... 198/437; 198/444

(58) Field of Classification Search
CPC ........ B65G 43/08; B65G 47/24; B65G 47/31; B65G 47/46

USPC .................................. 198/436–437, 444–446
See application file for complete search history.

(56) References Cited

U.S. PATENT DOCUMENTS 3,342,012 A  9/1967 Reading
3,741,368 A * 6/1973 Burkholder ................ 198/418.1
(Continued)

FOREIGN PATENT DOCUMENTS

JP  58-006816  1/1983

OTHER PUBLICATIONS

International Search Report for PCT/NL2012/05176 dated May 30, 2012.

*Primary Examiner* — Mark A Deuble
(74) *Attorney, Agent, or Firm* — Marvin Petry; Stites & Harbison PLLC

(57) ABSTRACT

The present invention relates to an egg transport device for a packaging device for eggs, comprising a distribution conveyor which extends in a direction of transport from a feed outer end to a discharge outer end and which, as seen in the direction of transport, is bounded on either side by guides extending at least substantially in the direction of transport, which egg transport device is adapted to deliver eggs over at least two discharge tracks of a discharge conveyor (12) which are distributed in a width direction extending at right angles to the direction of transport, wherein the feed conveyor comprises at least over a part of its length at least two distribution belts (17) extending parallel to each other and drivable independently of each other by drive devices, and distributing sections (9) lying in the line thereof, and sensors (7,10) are further provided which during use detect the delivery of an egg to a distributing section (9).

15 Claims, 3 Drawing Sheets

(51) Int. Cl.
*B65G 47/31* (2006.01)
*B65B 23/06* (2006.01)

(56) References Cited

U.S. PATENT DOCUMENTS 4,042,100 A * 8/1977 Morrone .................. 198/446
4,276,977 A    7/1981 Van Kattenbroek
4,401,207 A *  8/1983 Garvey .................... 198/580
4,932,514 A *  6/1990 Doppenberg ............. 198/445
6,000,526 A * 12/1999 van Veldhuisen et al. .... 198/446
6,776,278 B1 * 8/2004 Gross et al. .............. 198/416
6,811,017 B1 * 11/2004 Gross et al. .............. 198/453
7,441,645 B2 * 10/2008 Paquin et al. ............ 198/347.1
7,743,906 B2 *  6/2010 Accettura ................. 198/446
2013/0056329 A1 * 3/2013 Grootherder et al. ...... 198/444

* cited by examiner

EGG TRANSPORT DEVICE FOR A PACKAGING DEVICE FOR EGGS

According to a first aspect, the present invention relates to an egg transport device for a packaging device for eggs comprising a feed mat which extends in a direction of transport from a feed outer end to a discharge outer end and which, as seen in the direction of transport, is bounded on either side by guides extending at least substantially in the direction of transport, which egg transport device is adapted to deliver eggs over at least two discharge tracks of a discharge conveyor which are distributed in a width direction extending at right angles to the direction of transport. The discharge tracks can be part of a dosing mat.

A known egg transport device is adapted, as part of a packaging device for eggs, to distribute eggs over two or more, usually five or six discharge tracks in order to package the eggs in a subsequent step per corresponding number or multiple thereof. A problem of current egg transport devices is that it is not automatically the case that the distribution over the discharge tracks takes place without disruption. That is, the feed mats are not suitable for continuous delivery of always the correct number of, say n, eggs at a speed adapted to the packaging capacity of a packaging device to be supplied. A reason for this is that the eggs, because of their shape, move in uncontrolled manner over the feed mat, whereby the flow to one or more discharge tracks can be temporarily obstructed. Increasing the speed of the feed mat is not a solution since this increases the chance of accumulation of eggs, and thereby the risk of breakage of eggs as a consequence of a pushing pressure.

This problem of the known egg transport devices has not been satisfactorily resolved. A partial solution in the known devices is to temporarily stop the feed mat in the case of a blockage so that the blockage can be manually cleared in order to ensure that all discharge tracks subsequently receive eggs again. This takes place in a parallel packer. Another partial solution is to compensate for the absence of one or more eggs in a row of a discharge track in a further process so that all packages are still wholly filled. This takes place in a serial packer. Serial packers are however slower than parallel packers. Both partial solutions reduce the maximum attainable capacity of a packaging device.

The present invention therefore has for its object, according to a first aspect, to provide an egg transport device according to the preamble with which supplied eggs can be presented to all discharge tracks with a greater reliability and with less or no manual intervention than with the known egg transport device. This object is achieved according to the present invention in that the feed mat comprises at least over a part of its length an egg distributor with at least two distribution mats extending parallel to each other and drivable independently of each other by drive devices, and distributing sections lying in the line thereof, and that sensors are further provided which during use detect a delivery of an egg to a distributing section. Such a distributor provides the option of driving the distribution mats at different speeds in determined situations, whereby a blockage upstream of the distribution mats can be prevented or can be cleared more quickly than in the known egg transport devices. The intended objective of the invention is thus achieved. The egg transport device is provided with the sensors which are adapted to measure the throughflow of eggs between the distribution belts and the corresponding distributing sections. This provides the option of controlling the drive of the distribution mats by means of a control device on the basis of data generated by the sensors.

The drive of a feed conveyor disposed upstream can moreover be controlled on the basis of detection by a sensor.

The distributing sections are preferably located between the distribution mats and the discharge tracks, but can optionally also be accommodated integrally therein.

A sensor is preferably provided at the beginning and/or at the end of each discharge track in order to detect passage of an egg. The number of eggs in a discharge track can thus be determined as the difference between the number of eggs that has passed the beginning and the end of the discharge track. By comparing the number of eggs present in the different distributing sections a control device can determine whether the pushing pressure, and therefore the drive, of one or more distribution mats has to be adjusted.

Upstream of the distribution mats one or more sensors can further be provided which are adapted to detect the distance to which eggs for distribution accumulate on the feed mat in front of the distributing sections. When the number of eggs in front of the distribution mats is relatively high, the chance of breakage due to pushing pressure increases. A sufficient number of eggs must on the other hand be present in front of the distributing sections in order to distribute eggs in appropriate manner and with sufficient flow over the distributing sections.

The feed mat is preferably provided over the width with separating means in order to divide a combined supply flow into a desired number of sub-flows extending parallel to each other. The separating means can for instance comprise a strip with holes corresponding to the distributing sections. Alternatively, the separating means can form gates by means of one or more uprights provided at right angles to the feed mat between two intended separated flows.

In a preferred embodiment according to the present invention the separating means are provided close to a transition between the distribution mats and the distributing sections. A combined supply flow of eggs can thus be divided into sub-flows close to the relevant transition.

In order to prevent damage to eggs at a transition between a feed mat extending over the whole width and two or more connecting distribution mats, a transfer strip can be provided extending at right angles to the direction of transport of the feed mat.

It is recommended that a transverse conveyor belt is provided at right angles to the direction of transport between the distribution conveyor and the distribution mats, which transverse conveyor can be driven at right angles to the direction of transport of the egg transport device. The risk of blockages can be further reduced by causing the transfer strip to make a reciprocal movement in controlled or random manner at right angles to the direction of transport.

Such a transverse conveyor belt upstream of distributing sections or a dosing mat could, independently of the distribution mats, also solve to at least some extent the problem which the present invention solves. For instance as egg transport device for a packaging device for eggs comprising a feed mat which extends in a direction of transport from a feed outer end to a discharge outer end and which, as seen in the direction of transport, is bounded on either side by guides extending at least substantially in the direction of transport, which egg transport device is adapted to deliver eggs over at least two discharge tracks of a discharge conveyor which are distributed in a width direction extending at right angles to the direction of transport, wherein the feed mat comprises a transverse conveyor belt at right angles to the direction of transport between the distribution conveyor and the distribution mats, which transverse conveyor is drivable at right angles to the direction of transport of the egg transport device. They egg transport device preferably comprises sensors which during use detect a delivery of an egg to a distributing section. The transverse conveyor belt can thus be controlled by a control for a drive of the transverse conveyor belt subject to the detection of the sensors.

For a good separation and/or guiding of individual sub-flows of eggs it is recommended that a bounding member extends between two adjacent distributing sections to the corresponding boundary between two distributing sections of a discharge conveyor which is connected or is to be connected. This prevents flows of eggs, once they have been separated, from mixing with each other again after the separation.

When the number of distribution mats corresponds to the number of distributing sections, the flow of eggs to each discharge track can be separately driven. It is possible for the number of distributing sections to be smaller than the number of discharge tracks, for instance one distributing section per two discharge tracks or otherwise. Since in known egg transport devices eggs tend to accumulate at one of the two sides of the feed mat, a division of the distribution conveyor into only two distribution mats and two distributing sections can already provide a considerable improvement relative to the prior art.

In a preferred embodiment according to the present invention the feed mat comprises a conveyor belt which extends over at least substantially the whole width of the feed mat and which is drivable in the direction of transport of the egg transport device. Conveyor belts are highly suitable for transporting eggs.

The distribution mats of the egg transport device likewise preferably each comprise a conveyor belt.

An even better transition between the distribution mats and corresponding distributing sections is achieved when the distribution mats extend as far as a transfer strip extending over the width of the feed mat in front of the distributing sections. The transfer strip supports a good transition between the different conveyors and thus reduces the risk of eggs breaking.

According to a second aspect, the present invention relates to a packaging device for eggs, comprising an egg transport device according to the first aspect of the present invention present between a feed conveyor and a discharge conveyor. The egg transport device need not of course be situated directly between the feed conveyor and the discharge conveyor. The terms feed conveyor and discharge conveyor must moreover be interpreted broadly in the context of the present invention. A packaging device connecting directly onto the egg transport device would in this context also have to be deemed a discharge conveyor.

According to a third aspect, the present invention relates to a method for improving the flow of eggs to an existing packaging device for eggs, comprising a feed conveyor, an egg transport device and a discharge conveyor, comprising the step of placing an egg transport device according to the first aspect of the present invention between the feed conveyor and the discharge conveyor. The egg transport device according to the present invention can for instance replace an existing egg transport device. Owing to improved distribution characteristics of the egg transport device with an egg distributor according to the first aspect of the present invention a feed mat situated upstream of the distribution mats and extending over the width of the egg transport device can be given a relatively short form, so that the replacement egg transport device can be connected to the feed conveyor and discharge conveyor without having to displace either of these two conveyors.

According to a fourth aspect, the present invention relates to a method for distributing a combined flow of eggs over a desired number of sub-flows using an egg transport device. According to the present invention the method comprises the step of transferring the eggs from a feed mat extending over the width of the egg transport device to at least two distribution mats extending parallel to each other and drivable independently of each other in line with the feed mat. This may also be interpreted broadly in the sense that the distribution mats need not by definition connect directly onto the feed mat, but that an intermediary means can be situated between. The term 'in line with' is understood to mean in the line of the direction of transport, which need not run in a straight line.

The present invention will be elucidated hereinbelow with reference to the accompanying figures, in which.

Figure 1:
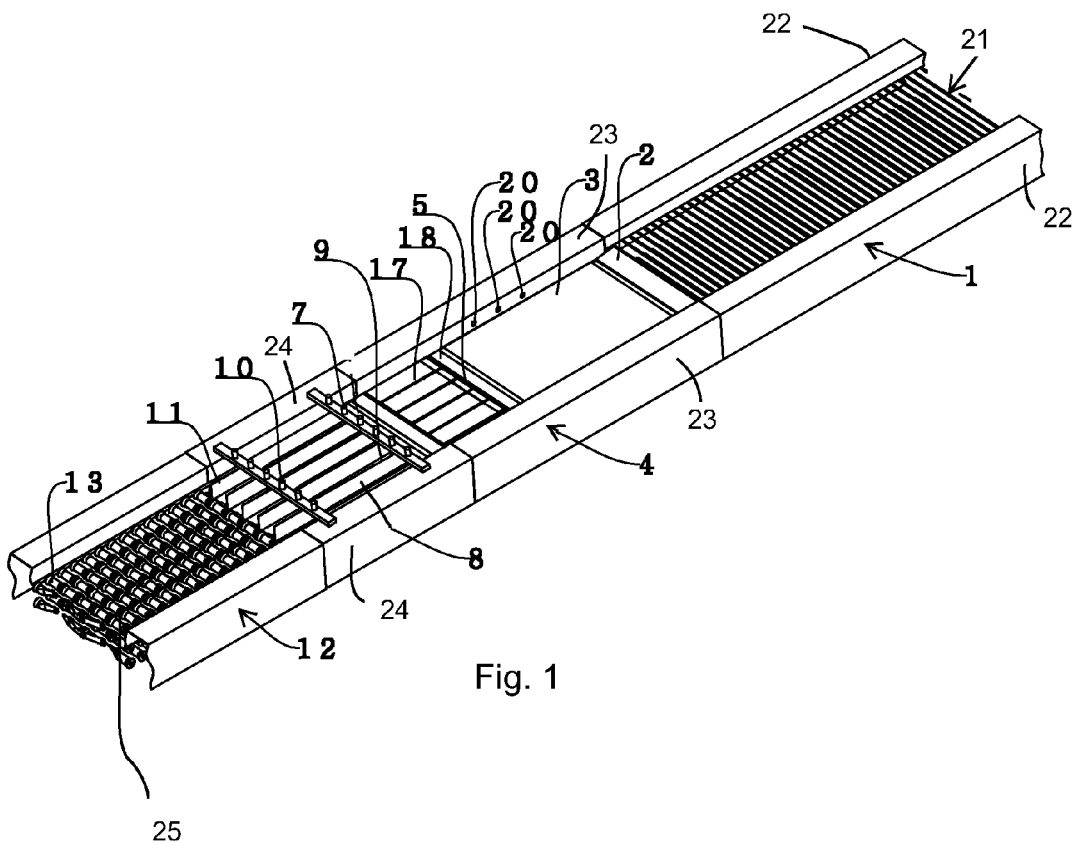
FIG. 1 is a perspective view of a part of a packaging device for eggs with an egg transport device according to the present invention.

FIG. 1 is a perspective top view of a part of a packaging device for eggs with a feed conveyor 1, an egg transport device 4 and a discharge conveyor 12. The feed conveyor 1 has a bar conveyor 21 with a drive (not shown) and two guides 22 which serve to prevent eggs possibly falling out at the side of bar conveyor 21. Situated downstream of the feed conveyor 1 is a transfer strip 2 which acts as a kind of uncoupling between the driven feed distributor 1 and the driven egg transport device 4. The egg transport device 4 has a conveyor belt 3 with a drive (not shown), a transverse distribution belt 18 and six distribution belts 17 extending adjacently of each other in the longitudinal direction and each with a separate drive (not shown). Situated downstream of the conveyor belt 3 is a transfer strip 5 which provides a transition between the conveyor belt 3 and the distribution belts 17. Situated downstream of the distribution belts 17 is a transfer strip 5 which provides a transition between the distribution belts 17 and a dosing mat 8 which carries eggs in the direction of the discharge conveyor 12. Situated above the dosing mat 8 are bounding walls 11 which define six tracks for eggs. Likewise present at the start above the dosing mat 8 are six entry sensors 7 and close to the end six exit sensors 10 which respectively measure how many eggs are delivered from the egg transport device 4 per track to the dosing mat, and how many eggs are set down per track onto the discharge conveyor 12. Situated between the distribution belts 17 and discharge tracks of the dosing mat are distributing sections (not shown). There is one distributing section per distribution belt 17. Two or more discharge tracks can be associated with a distributing section. In the first case the entry sensors can be situated at the position of a distributing section of the discharge track. In the second case a sensor at the position of the distributing section will count the passage of eggs in the associated distributing section. A further entry sensor can in this case be provided per discharge track, but this is not essential.

The conveyor belt 3, the group of distribution belts 17 and the dosing mat 8 are flanked by guides 23, 24 which serve to prevent eggs possibly falling out at the side of the egg transport device. Situated in the guides 23 are in this case three buffer sensors 20 in the form of photocells which detect whether eggs accumulate up to the relevant buffer sensor 20. This measurement takes place in that the buffer sensors measure how far back the eggs extend in front of the distribution belts. The speed of the feed conveyor 1 is adjusted on the basis hereof so that it is possible to continue packaging at high speed and with little or no disruption. A discharge conveyor 12 is situated downstream of the egg transport device 4 with dosing mat 8. The discharge conveyor 12 has a bar conveyor 25 with six conveyor rollers 13 on each bar. The six conveyor rollers of two adjacent bars at a time define six set-down locations for eggs. The discharge conveyor 12 transport eggs to an egg packaging unit (not shown) which has to be supplied each time with six eggs per stroke.

Figure 2:
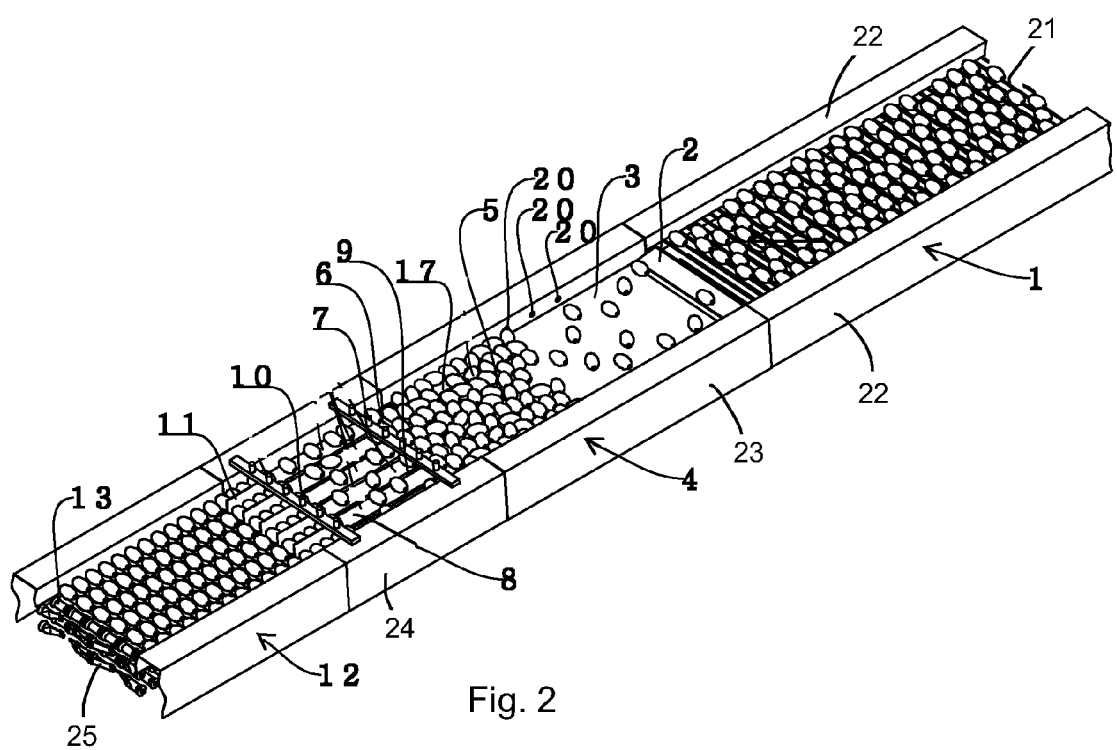
FIG. 2 is a perspective view of the device of FIG. 1, now however in operation.

FIG. 2 shows the device of FIG. 1 in operation. Eggs are supplied via the feed conveyor 1 on the bar conveyor 21 with a continuous though variable flow of eggs. The speed at which the bar conveyor 21 is driven depends on the measurements by the buffer sensors 20, which detect to which level a buffer of eggs is being presented by egg transport device 4 to the dosing mat 8. Eggs roll from the bar conveyor 21 via a (non-driven) transfer strip 2 onto the conveyor belt 3 which transports the eggs further in the direction of the distribution mats 17 and the dosing mat 8, after which the distribution mats 17, because of the independent speed control, transport and distribute the eggs to the distributing sections and the discharge tracks. Situated above the dosing mat 8 are bounding walls 11 which divide the combined transport width of the device into six tracks 9. At this division the speed of the eggs is temporarily slowed because the eggs which are carried unordered via the conveyor belt 3 and the distribution belts 17 in the direction of the dosing mat 8 have to find their way to one of the tracks 9. This reduction in speed results in an accumulation of eggs on the distribution belts 17 and the conveyor belt 3 in front of the dosing mat 8. This accumulation is on the one hand desirable, since sufficient eggs are hereby always being presented to the dosing mat 8. A (too) great accumulation of eggs is on the other hand undesirable because of the risk of breakage when the pushing pressure of the eggs becomes (too) great. The feed of eggs via the feed conveyor 1 is thus controlled subject to the accumulation of eggs on the conveyor belts 3 measured by the buffer sensors 20, i.e. when (too) many eggs are present on the conveyor belt 3 the transport speed of the feed conveyor 1 decreases.

Another phenomenon characteristic of eggs is the fact that eggs tend to roll to one side on a conveyor belt. This is the result of the asymmetrical form of eggs. When a relatively large number of eggs roll to a determined side of the conveyor belt 3, a relatively large number of eggs are presented at the relevant side, whereby the buffer sensors 20 generate the signal that the conveyor belt 3 is relatively well filled. It is however then possible that relatively few eggs are being presented on the other side. After a time this situation will be more or less resolved in that eggs will also roll, at random, in the direction of the relatively empty side. A more uniform distribution of eggs over the width of the conveyor belt 3 is however desirable.

Another phenomenon which occurs in the egg transport device 4 is that the eggs must be displaced from a relatively unordered state to an ordered state for the tracks 9. As a result of the fact that eggs always pass through one or more gates on one of the tracks 9, in combination with the pushing pressure of eggs on the conveyor belt 3, this process takes place adequately. The entry to one or more of the tracks 9 is however sometimes blocked because the eggs at the front of the associated track/tracks 9 become stuck fast and almost or wholly immobile relative to each other. In the device according to the invention, and in particular the device according to the preferred embodiment as discussed here, a measure is provided with distribution belts 17 drivable independently of each other which helps significantly in preventing and, where applicable, in more rapid clearing of blockages on the egg transport device 4. When a relative difference in feed to one or more of the tracks 9 is detected by means of the entry sensors 7, the transport speed of the corresponding distribution belt(s) 17 is increased relative to the speed of the other distribution belts 17. An accumulation of eggs on, say, the right-hand side of the conveyor belt 9 can thus be compensated by increasing the transport speed of one or two distribution belts 17 on the left-hand side of the conveyor belt 3. This would perhaps appear at first sight to be illogical because it is precisely on the left-hand side that relatively few eggs are present. However, by guiding the eggs on the relevant side more quickly to the associated track/tracks 9 the pushing pressure of the eggs will have a compensating effect. As additional though optional measure, a transverse distribution belt 18 is provided in the egg transport device 4 which can be driven in the width direction of the conveyor belt 3, i.e. at right angles to the direction of transport of the eggs, in order to better distribute the eggs over the width of the egg transport device 4. The distribution belt 18 is a corrective measure. When there is an ideal distribution of eggs over the egg transport device 4, the transverse distribution belt 18 will not therefore be driven. However, when an irregular distribution of eggs occurs over the egg transport device 4, measured for instance by the buffer sensors 20 and/or entry sensors 7, the transverse distribution belt 18 is temporarily activated to displace eggs via the transverse distribution belt 18 to the side with relatively few eggs. When the transport speed of one or more distribution belts 17 on the relatively empty side of the egg transport device 4 is then driven at a relatively high speed compared to the other distribution belts 17, this enhances the effect of obtaining a better distribution of eggs over the width of the egg transport device 4. Likewise when congestion is detected in front of one or more of the tracks 9, the pushing pressure for the relevant track/tracks is increased by increasing the transport speed of the corresponding distribution belt(s) 17. The eggs which have moved onto one of the tracks 9 then roll further to a buffer in the relevant track 9 in front of the transition to the discharge conveyor 12. The discharge conveyor 12 takes up a row of six eggs at a time and transports the eggs further in per se known manner to a packaging unit (not shown).

Figure 3:
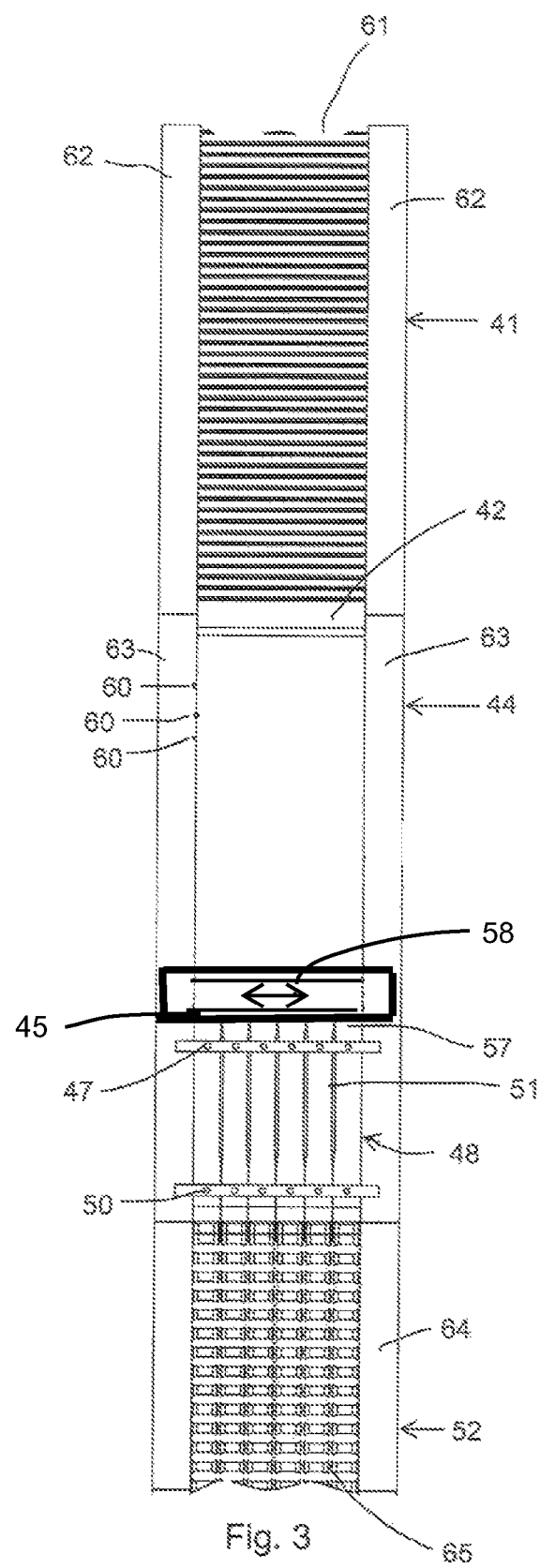
FIG. 3 is a schematic top view of a part of a packaging device for eggs with an alternative egg transport device.

FIG. 3 shows a top view of an alternative embodiment of a part of a packaging device for eggs with a feed conveyor 41, an egg transport device 44 and a discharge conveyor 52. The feed conveyor 41 has a bar conveyor 61 with a drive (not shown) and two guides 62 which serve to prevent the possibility of eggs falling off the side of the bar conveyor 61. Situated downstream of the feed conveyor 41 is a transfer strip 42 which acts as a kind of uncoupling between the driven feed distributor 41 and the driven egg transport device 44. The egg transport device 44 has a conveyor belt 3 with a drive (not shown), a transverse distribution belt 58 and a transfer strip 45. The transverse conveyor belt 58 is drivable via a drive (not shown) in the width direction relative to the direction of displacement of the eggs. Situated behind the transfer strip are six distributing sections 57 with bounding walls 51 which extend upstream from the dosing mat 48 to the transfer strip 45. The dosing mat 48 is adapted to carry eggs in the direction of discharge conveyor 52. Situated above the dosing mat 48 are the bounding walls 51 which define six tracks for eggs. Likewise situated at the start above the dosing mat 48 are six entry sensors 47 and at the end six exit sensors 50 which measure respectively how many eggs are delivered from the egg conveyor 44 per track to the dosing mat 48 and how many eggs are set down per track onto the discharge conveyor 52. Two or more discharge tracks can be associated with a distributing section. In FIG. 3, however, one discharge track is provided per distributing section. From the dosing mat 48 eggs follow the path in the direction of the discharge conveyor 52 as described above with reference to FIGS. 1 and 2.

The present invention has been elucidated in the figures and the above description on the basis of only one exemplary embodiment according to the present invention. It will however be apparent that many variants, which may or may not be obvious to the skilled person, can be envisaged within the scope of protection of the invention defined by the following claims. The number of eggs in a row can thus be varied. In practice the number of eggs will usually amount to five or six per row. Other numbers per row can likewise be envisaged. Because of its relative lack of susceptibility to malfunction the present invention brings closer the possibility of even packaging a multiple of five or six eggs per row. The transport device shown in the figures has two series of guides aligned relative to each other. It is however possible for the guides to be disposed converging relative to each other downstream or in other manner. The figures show only the embodiment wherein a separate distribution belt is provided per track. It is however also possible to provide a distribution belt for two or more discharge tracks, for instance three distribution belts and three distributing sections for two tracks at a time or two distribution belts and distributing sections for two tracks separated by a distribution belt and a distribution section for one track in a packaging device in which five eggs are oriented in a row. In the described embodiment a choice is made for a bar conveyor as feed conveyor and conveyor belts in the case of the distributor. The type of conveyor can however be freely chosen.

The invention claimed is:

1. An egg transport device for a packaging device for eggs, comprising a feed mat which extends in a direction of transport from a feed outer end to a discharge outer end and which, as seen in the direction of transport, is bounded on either side by guides extending at least substantially in the direction of transport, which egg transport device is adapted to deliver eggs over at least two discharge tracks of a discharge conveyor which are distributed in a width direction extending at right angles to the direction of transport, characterized in that the feed mat comprises at least over a part of its length an egg distributor with at least two distribution mats extending parallel to each other and drivable independently of each other by drive devices, and distributing sections lying in the line thereof, and that sensors are further provided which during use detect a delivery of an egg to a distributing section.

2. An egg transport device according to claim 1, characterized in that the distributing sections are located between the distribution mats and the discharge tracks.

3. An egg transport device according to claim 2, characterized in that a sensor is provided at the beginning and/or at the end of each discharge track in order to detect passage of an egg.

4. An egg transport device according to claim 1, characterized in that upstream of the distribution mats one or more sensors are provided which are adapted to detect the distance to which eggs for distribution accumulate on the feed mat in front of the distributing sections.

5. An egg transport device according to claim 1, characterized in that the feed mat is provided over the width with separating means in order to divide a combined supply flow into a desired number of sub-flows extending parallel to each other.

6. An egg transport device according to claim 5, characterized in that the separating means extend from a transition between the distribution mats and the distributing sections to the corresponding discharge tracks.

7. An egg transport device according to claim 1, characterized in that a transverse conveyor belt drivable at least substantially at right angles to the direction of transport of the egg transport device is provided upstream of the distribution mats between the feed mat and the distribution mats.

8. An egg transport device according to claim 1, characterized in that a bounding member extends between two adjacent distributing sections to the corresponding boundary between two distributing sections of a discharge conveyor which is connected or is to be connected.

9. An egg transport device according to claim 1, characterized in that the number of distribution mats corresponds to the number of distributing sections.

10. An egg transport device according to claim 1, characterized in that the feed mat comprises a conveyor belt extending over at least substantially the whole width of the feed mat.

11. An egg transport device according to claim 1, characterized in that the distribution mats each comprise a conveyor belt.

12. An egg transport device according to claim 1, characterized in that the distribution mats extend as far as a transfer strip extending over the width of the feed mat in front of the distributing sections.

13. A packaging device for eggs, comprising an egg transport device according to claim 1 present between a feed conveyor and a discharge conveyor.

14. A method for improving the flow of eggs to a packaging device for eggs, comprising a feed conveyor, an egg transport device and a discharge conveyor, comprising the step of placing an egg transport device according to claim 1 between the feed conveyor and the discharge conveyor.

15. A method for distributing a combined flow of eggs over a desired number of sub-flows using an egg transport device, comprising the step of transferring the eggs from a first part of a feed mat extending over the width of the egg transport device to a second distributor with at least two distribution mats extending parallel to each other and drivable independently of each other, comprising a part of the feed mat lying in line with the first part of the feed mat.

* * * * *